May 21, 1963  E. P. VIRTUE ETAL  3,090,639
IMPLEMENT ATTACHING HITCH MECHANISM
Filed April 24, 1961  4 Sheets-Sheet 1
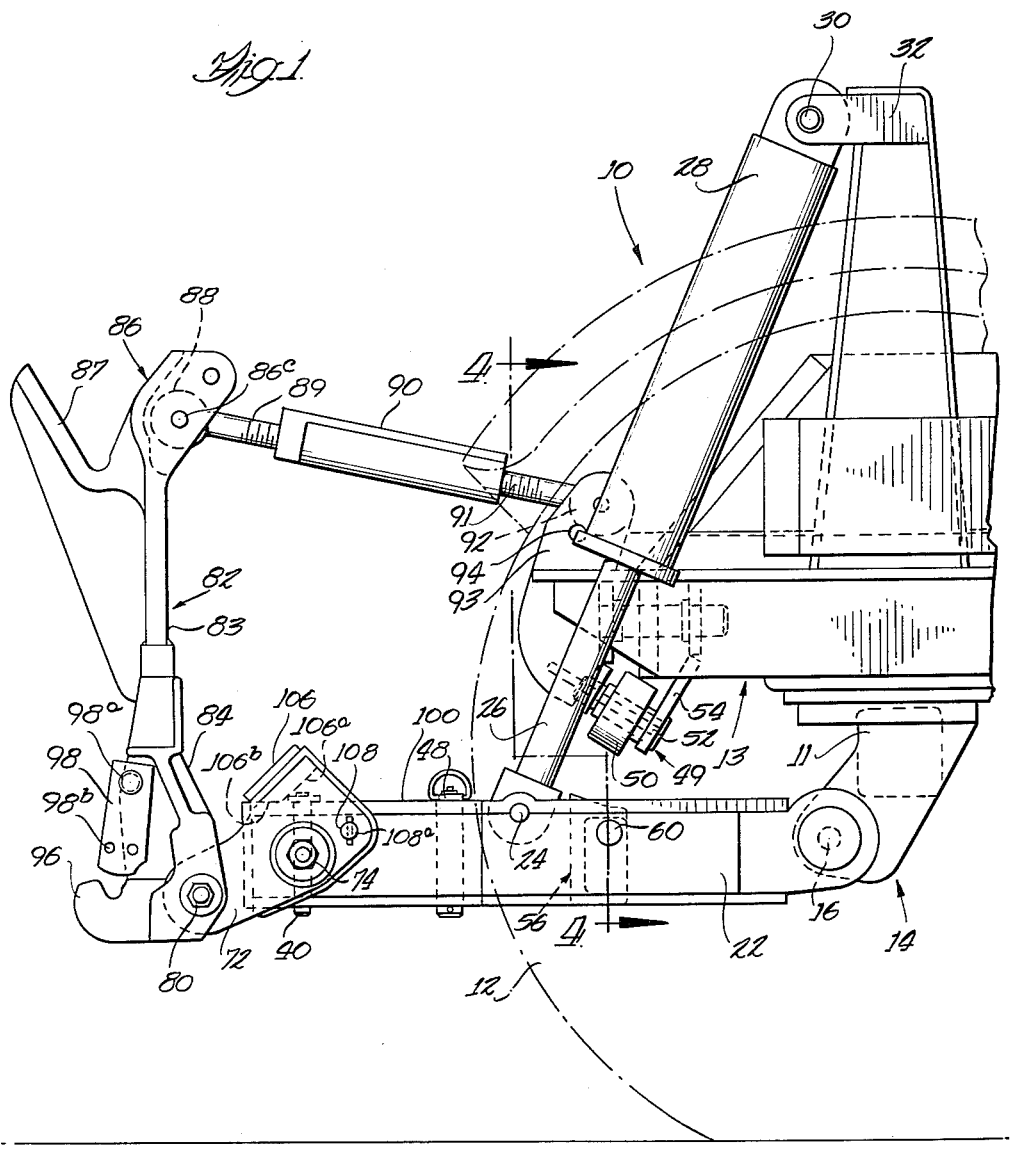
INVENTORS
EUGENE P. VIRTUE
DONALD W. MOYER
ATTORNEY

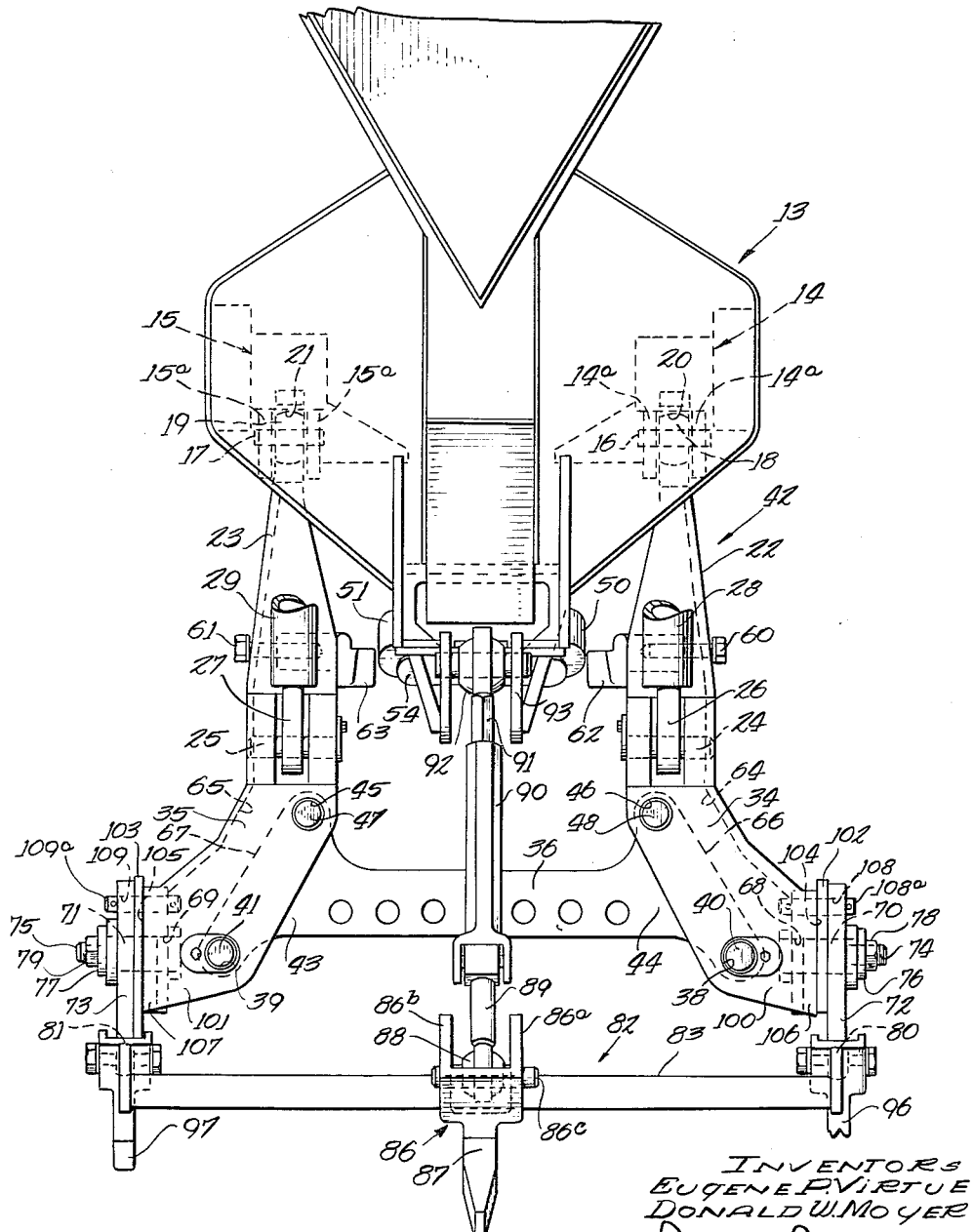

May 21, 1963 E. P. VIRTUE ETAL 3,090,639
IMPLEMENT ATTACHING HITCH MECHANISM
Filed April 24, 1961 4 Sheets-Sheet 3
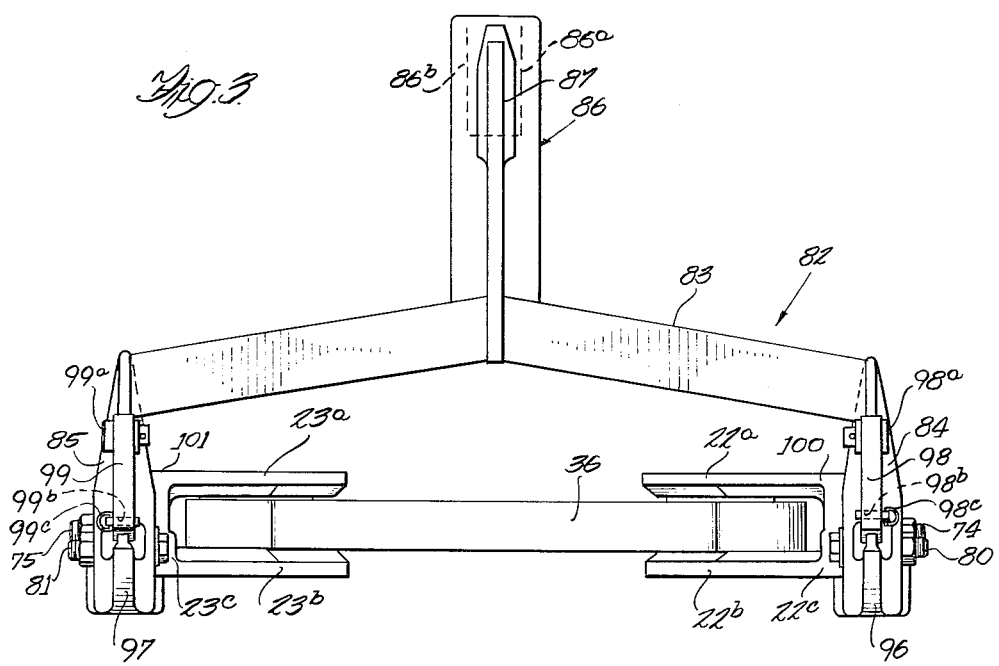
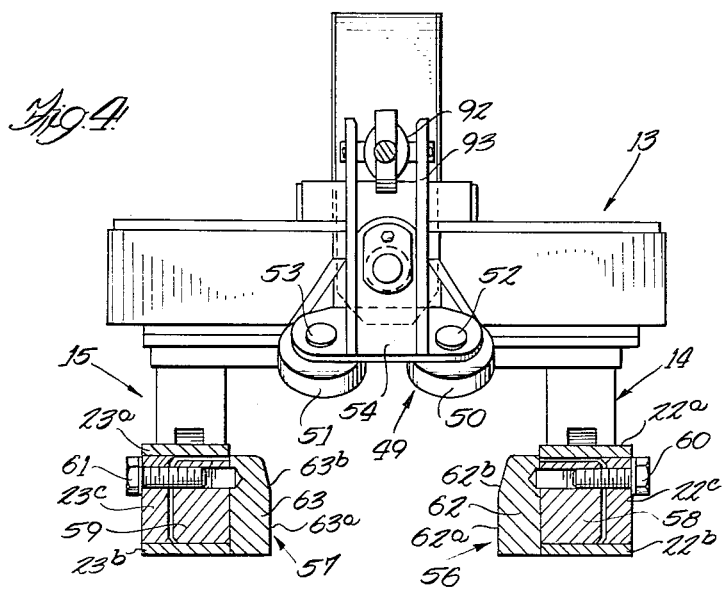
INVENTORS
EUGENE P. VIRTUE
DONALD W. MOYER
ATTORNEY

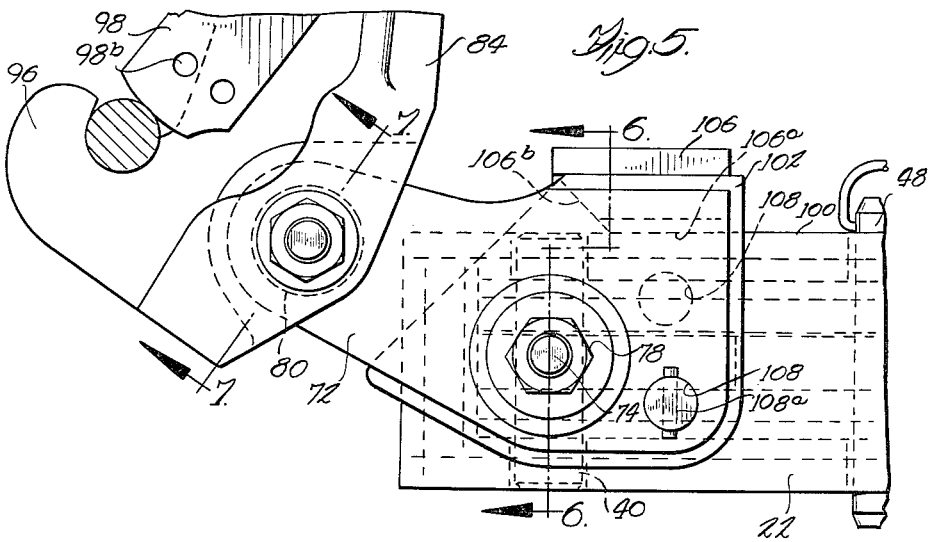
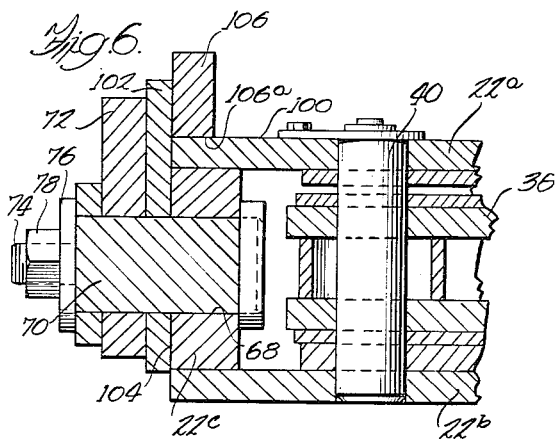
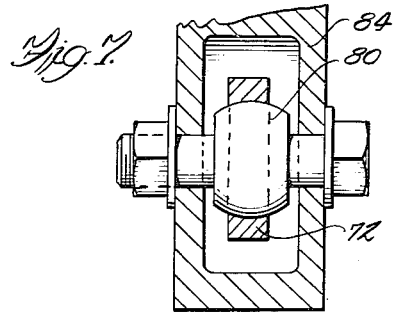
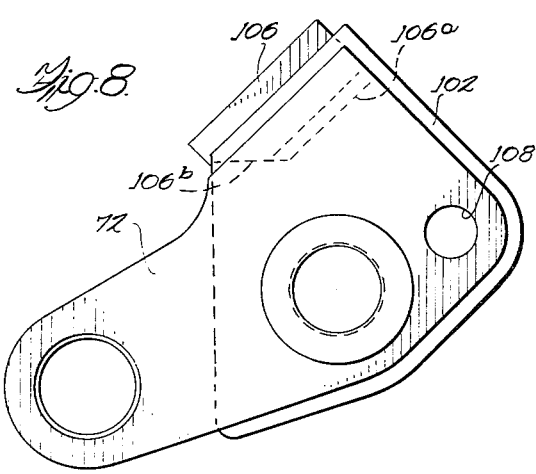
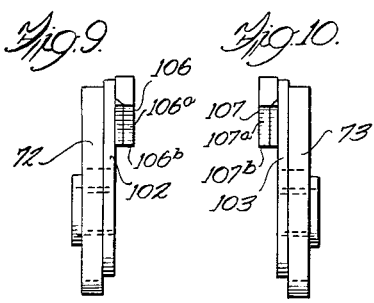

United States Patent Office 3,090,639
Patented May 21, 1963

3,090,639
IMPLEMENT ATTACHING HITCH MECHANISM
Eugene P. Virtue, Tinley Park, and Donald W. Moyer, Chicago, Ill., assignors to International Harvester Company, Chicago, Ill., a corporation of New Jersey
Filed Apr. 24, 1961, Ser. No. 105,172
5 Claims. (Cl. 280—474)

This invention relates to earthworking equipment, but more particularly it is directed to implement-attaching apparatus for detachably affixing such an implement to a propelling vehicle. More specifically, however, it is concerned with attaching an implement through a three-point type of fastening hitch to a tractor vehicle.

In the past, numerous mechanisms have been produced and marketed for such purposes, and it is to an improved form of such apparatus that the present invention is directed. It is a primary object of the present invention, therefore, to provide a flexible, highly adaptable and readily stabilized hitch mechanism of the three-point type for supportably attaching an earthworking implement to a vehicle, and more generally to provide an improvement over the apparatus heretofore described and claimed in the co-pending U.S. patent application Serial No. 65,704 assigned to the same assignee as the invention herein.

An important object is to provide in an implement-attaching hitch mechanism improved means for selectively permitting a limited amount of lateral sway or for restricting lateral sway completely of said mechanism in certain vertical positions of the mechanism relative to the supporting vehicle.

Another important object is to provide in an implement-attaching hitch mechanism an improved means to selectively permit a limited amount of float or to completely restrict float in a vertical direction of the implement-attaching connecting portions of the mechanism without effecting actuation of power lift means associated with said mechanism.

Another primary object is to provide, in an implement-attaching hitch mechanism of the three-point type wherein a pair of independently actuable hydraulic power lift means are utilized for raising and lowering said mechanism, an improved means to effect simultaneous and coordinated movements of the hitch mechanism without utilizing an interconnecting rockshaft between said independently actuable lift means.

Another object is to provide an improved implement-attaching hitch mechanism having a pair of laterally spaced-apart draft link arms pivotally carried by a vehicle at their forward ends and interlockable at their rearward ends for simultaneous movement and further having the rearward ends of said arms provided each with extension means mountable thereon and fashioned so as to be selectively positionable to move with the respective arms as an extension thereof or to be independently pivotable a limited amount in a vertical plane relative to the respective arm.

A further object is to provide, in an implement-attaching mechanism wherein a pair of independently actuable hydraulic power lift means are utilized for raising and lowering a pair of laterally spaced-apart draft link arms pivotally carried by a vehicle at their forward ends and interlockable at their rearward ends for simultaneous movement, an improved means including rollers and cam surfaces cooperable in certain operating positions of the mechanism for limitingly controlling sway or lateral swinging of the draft link arms.

Other objects and advantages will be understood and will become apparent from the following description when read in conjunction with the accompanying drawings, wherein:

FIGURE 1 is an elevational view of the proposed hitch mechanism and shown as employed on a tractor vehicle, the latter of which is fragmentarily illustrated;

FIGURE 2 is a top plan view, wherein certain components are fragmentarily depicted, of the hitch mechanism shown in the preceding figure;

FIGURE 3 is an end-elevational view of the proposed hitch mechanism;

FIGURE 4 is a fragmentary vertical sectional view taken generally along the line 4—4 of FIGURE 1;

FIGURE 5 is a fragmentary elevational view in enlarged dimension, generally similar to FIGURE 1, but showing the float linkage connecting means raised to the upper or top limit of its float position;

FIGURE 6 is a fragmentary vertical sectional view taken generally along the line 6—6 of FIGURE 5;

FIGURE 7 is a fragmentary vertical sectional view taken generally along the line 7—7 of FIGURE 5;

FIGURE 8 is an elevational view (in enlarged dimensions) of the right-side (as viewed in FIGURES 2 and 3) intermediate or extension link member;

FIGURE 9 is an end elevational view (in reduced dimensions) of the right-side extension link shown in the preceding view; and FIGURE 10 is a view similar to FIGURE 9 of the left-side extension link member.

The proposed invention is shown as utilized with a tractor vehicle, but since the complete vehicle forms no particular part of the invention, the vehicle is shown only fragmentarily in the attached drawings. The tractor vehicle may be of any well-known construction which includes a suitable frame or chassis, such as represented generally by the reference numeral 10, which in turn, includes as a conventional component thereof a rear axle housing structure 11 which supportably mounts a pair of laterally spaced-apart traction wheels 12, only one of which is shown. A cradle member, indicated generally at 13, may be used for interconnecting the axle structure and the chassis or frame of the vehicle to permit relative oscillation thereof, but since a full disclosure of the structural details thereof has been provided in the co-pending U.S. patent application of Karl Salna, Serial No. 46,500, now Patent No. 3,047,308, and since such details is not essential to a comprehensive understanding of the instant invention these details are omitted herefrom.

Depending from the axle housing structure portion 11 of the vehicle and suitably secured to said structure are a pair of laterally spaced-apart brackets 14, 15. Each of these brackets may be fashioned with a pair of laterally spaced arms 14a, 14a and 15a, 15a that pivotally mount therein pins 16, 17 for supporting spherical-shaped ball members 18, 19, in turn, mounted in spherical-shaped sockets 20, 21 in the forward ends of lower draft links or hitch arm members 22, 23. Each such draft link or hitch arm may be fashioned as a channel-like member having upper and lower horizontally extending legs 22a, 22b and 23a, 23b, respectively, interconnected by a vertical web or wall 22c, 23c whereby in cross-section each such link arm resembles an overturned U-shape with the open mouth of the channel thereof facing inwardly toward a longitudinally extending central axis of the vehicle. Horizontally disposed pins 24, 25, respectively, mounted in each draft link or hitch arm supportably and pivotally mount the free ends of piston rods or drop links 26, 27 forming part of the expandable and contractible hydraulic rams, indicated generally at 28, 29, while the opposite ends of said rams are each supported and pivotally mounted by a pin such as 30 (only one of which is shown) on a bracket such as 32 (only one shown), in turn, suitably affixed to the cradle member portion 13 of the vehicle. It will be understood, of course, that a suitable source of hydraulic pressure will be provided to operate said rams and that such will be supplemented by a conventional control valve and interconnected hydraulic system, but since these elements form no particular part of the structure of the present invention, the details thereof have been omitted herein.

The rearward or outward end portion of each draft link or hitch arm bends or flares outwardly, as indicated at 34, 35, and these end portions are interconnected by a transverse horizontally extending drawbar member shown generally at 36. The vertical dimension of the drawbar is selected to permit each end of said drawbar member to be freely positioned in the open mouth of the channel formed in a respective hitch arm 22, 23. Vertically disposed aligned apertures 38, 39, in the respective hitch arms and in the proximate end portions of said drawbar, are adapted to receive pins such as 40, 41 for pivotally fastening or securing the drawbar to the hitch arms and thus providing, in effect, a hitch frame, shown generally by the reference numeral 42, in which said hitch arms and transverse drawbar constitute three sides while the axle housing structure provides a fourth side therefor. It will be appreciated, now, that any lateral movement or sway of the hitch frame 42 will cause said frame to pivot about the ball and socket points 18, 20 and 19, 21 through which said frame is secured at one end thereof to the axle housing, and about the pivot fastening pins 40, 41 disposed at the other or rearward end of said frame. Each end of the transverse drawbar 36 may be formed with an angularly extending enlarged wing-like portion such as 43, 44, and the forwardly extending end of each such portion may be provided with vertically disposed apertures alignable with similar apertures 45, 46 in the respective hitch arms and which apertures when aligned are adaptable to respectively receive removable interlocking pins such as 47, 48. When said forwardly disposed apertures in the wings of the drawbar and the associated apertures in the respective hitch arms have been aligned, the interlocking pins 47, 48 are insertable for stabilizing the frame 42 and making it rigid for resisting lateral thrust or side sway. Since the hitch arms will be interlocked with the transverse drawbar member, at four points across the corners thereof, when said interlocking pins are placed, it will be appreciated that a very rigid structure will be formed as a result thereof, and as thus interlocked the structure will not permit lateral movement or side sway despite the fact that the forward end thereof is universally mounted to the vehicle. Likewise, when said hitch frame is raised or lowered by vertical pivoting about the forward ball and socket connections 18, 20 and 19, 21 as a result of motivation by either one of the separate hydraulic ram lift means 28, 29, the two opposite arms and interconnecting drawbar member of said frame will move as a relatively rigid unit without twisting or distorting, and hence both said arms thereof will move through substantially identical distances simultaneously. This is a particularly advantageous feature because of the fact that the hydraulic rams are not mechanically operatively interconnected by the conventional rockshaft which, when employed, serves to make these units operate together for moving both arms of the hitch uniformly. Now any slight variation in the operation of the separate hydraulic lift means, because of pressure differences or dimensional inaccuracies or the like, will not cause one arm of the hitch to move a different vertical distance than the other arm, but instead, because of the proposed unique construction of the hitch frame, the arms thereof will move uniformly without tilting or twisting.

An additional means for limiting lateral movement or side sway of the hitch mechanism, and which is particularly useful when the implement is carried in the transport position, although not limited to use in such position, is provided by the roller assembly indicated generally by the reference numeral 49, functioning in cooperation with the arms of the hitch frame. Said assembly includes a pair of laterally spaced rollers 50, 51 mounted by journaling pins 52, 53 in a bracket 54, in turn, suitably fixedly secured to the cradle member structure 13. The pins upon which said rollers are pivotally mounted are disposed at an angle upwardly tilting relative to the hitch arms in their lowered or depressed position for purposes which will soon be apparent. The rollers are dimensioned and disposed so that when the hitch mechanism is raised, such as to a transport position, said rollers will contactingly engage in closely abutting relationship with camming elements 56, 57 associated with the respective hitch arms 22, 23 thereby preventing lateral swinging movement or side sway of the hitch frame. Said camming elements may each be formed with portions such as 58, 59 that are dimensioned to fit between the upper and lower legs of a respective hitch link arm and which after insertion is securely but detachably positioned therewithin by suitable bolt means such as 60, 61, in turn, supported by the associated vertical web or wall, 22c 23c of a respective hitch arm. Such camming elements may also be fashioned with abutment parts 62, 63 having a camming surface on the inner face of each thereof that includes vertically extending portions 62a, 63a and portions 62b, 63b outwardly inclined relative to said vertically extending portions. On occasion, it becomes desirable to operate the hitch mechanism without the removable interlocking pins 47, 48 in place, in order to permit a limited amount of lateral movement or side sway for certain operations thereof, and in order to prevent extreme movements or excessive sway under such operating conditions, the mechanism is arranged so that when the hitch is raised slightly the inclined portions 62b, 63b of the camming surfaces may engage the proximate roller units, and hence it will be appreciated that in this manner lateral or side sway movement of the hitch, while permitted in certain positions thereof, will be controlled and maintained within acceptable limits.

The vertical inside faces of the connecting webs or walls 22c, 23c of the hitch arms 22, 23 form abutting surfaces such as 64, 65 disposed proximate the bend of said arms, which may serve as limit stops or bumpers for contacting engagement with the respective outside vertical end edges 66, 67 of the wing portions of the transverse drawbar member 36, thereby providing means for limiting lateral movement or side sway when the hitch frame is operated under conditions that permit a limited amount of side sway, such as when the locking pins 47, 48 have been removed and the hitch arms are being operated at an elevation such that the camming elements associated therewith do not engage the cooperating roller units of said roller assembly upon lateral sway. This stop or bumper arrangement may be considered as part of the overall means that cooperates with the interlocking pins to selectively permit limited sway or to completely restrict side sway of the hitch frame unit when the rollers and cam members are operative for sway control purposes.

The outboard or rearwardly extending flared end portions 34, 35 of the draft links or hitch arms 22, 23 may be provided with apertures 68, 69 for receiving enlarged bolt shoulder portions 70, 71 therein that journally support intermediate float links or extension members 72, 73, and large-headed bolts 74, 75 that include said shoulder portions, together with retaining washers 76, 77 and threaded nuts 78, 79 for said bolts cooperate to retain said float links against lateral displacement relative to said hitch arms while simultaneously permitting rotation of the float links relative to the respective draft links or hitch arms. The rearward ends of each of the said intermediate or float links, in turn, are pivotally connected by ball and socket pivotal connections such as 80, 81 to opposite ends of a rigid yoke or wishbone-like assembly, indicated generally at 82. Said yoke, which may be fashioned in any one of many different forms or configurations, as shown includes a centrally disposed curved or flat-arched portion 83 interconnecting oppositely positioned end plate members 84, 85 to which latter members the respective intermediate or float link members are pivotally connected. Medially of the ends of the arched portion 83 is a pin-hook bracket 86 that is fixedly secured, by a suitable means such as welding or the like, to the said arched portion for movement therewith. This bracket includes an open jaw hook 87, for receiving one of the pin-connecting members (not shown) of an attached implement, and a pair of spaced-apart arms 86a, 86b for supportably receiving the opposite ends of a mounting pin 86c forming part of a ball and socket connecting means 88. Said ball and socket connection serves to connect said pin-hook bracket with one end of a threaded rod 89 forming part of an adjustable turnbuckle device 90, and the opposite end of said turnbuckle is connected by a threaded rod 91 and a ball and socket connecting means 92 to a support bracket 93 suitably fixedly secured to the cradle member structure 13 of the vehicle. A plurality of vertically spaced openings such as the one shown at 94 in said support bracket may be provided to permit repositioning of the ball and socket connection 92 therewithin to accommodate different mounting positions for said turnbuckle link member.

Each of the end plate members 84, 85 are fashioned with a hook or jaw portion 96, 97 extending rearwardly therefrom that is adapted to receive a pin-connecting member (not shown) usually forming part of the ground-working implement to be attached thereto. Latch members 98, 99 pivotally mounted at 98a, 99a on said end plates are disposed so that they may be rotated into position to close the opening of the respective jaws 96, 97 and thus prevent accidental displacement of the implement-connecting pin therefrom. A pair of openings such as shown at 98b, 99b in said respective latch members are each alignable with openings in the associated yoke end plates for receiving removable pins 98c, 99c to fixedly position each of said latches in an open or closed position relative to a respective jaw.

The upwardly facing outer surfaces 100, 101 of the upper legs of the respective hitch arms 22, 23 provide abutment means adapted to engagingly receive in abutting or contacting relation complementally arranged projecting members carried by the intermediate or float link members for stop purposes as will now be more fully explained. As viewed in FIGURES 8-10, it will be seen that each of the intermediate link members 72, 73 are provided with bearing plate portions 102, 103 on the inner or inboard vertical sides thereof which are adapted to abuttingly engage in a slidable relationship the proximate outboard vertical bearing faces 104, 105 of the flared end portions of the respective hitch arms 22, 23. Projecting from the respective bearing plate portions 102, 103 are lug-like stops or projections 106, 107 which may, if desired, be fashioned integral with the plate portions and the intermediate link members, or may be separately fashioned and secured thereto by any suitable or well-known means, such as welding or the like, without deviating from any of the teachings of the present invention. The underside or downwardly facing surfaces of said lugs or projecting members are fashioned to provide forwardly disposed surfaces 106a, 107a and rearwardly disposed surfaces 106b, 107b coextensive with said forward surfaces but upwardly angled therefrom. As will be seen now by reference to FIGURE 1, when the intermediate links 72, 73 are rotated to their depressed or lowered position relative to the hitch arms the rearward underside downwardly facing surfaces 106b, 107b on the respective lugs 106, 107 will abuttingly engage portions of the cooperating proximate upper surfaces 100, 101 on the respective hitch arms. Likewise, referring to FIGURE 5, it will be seen that when the intermediate links 72, 73 (only one of which is shown in this view) are rotated to their elevated or upper position relative to the hitch arms the forwardly disposed downwardly facing surfaces 106a, 107a on the respective lugs 106, 107 will abuttingly engage other portions of the cooperating proximate upper surfaces 100, 101 on the respective hitch arms. Thus stops are provided to delimit the upward and downward rotative movement of the float or intermediate links relative to their respective draft link or hitch arm members. In this manner, the proposed device provides a float feature which permits a limited amount of vertical movement of the intermediate links and attached yoke member 82 together with the connections of an attached implement relative to the hitch arms and the vehicle, without necessitating operation of the associated hydraulic lift means. Such flexibility is particularly useful to accommodate and allow for limited amounts of lateral misalignment of the yoke assembly and its attached implement relative to the tractor and the lower draft links or hitch arms of the mechanism.

Apertures 108, 109 in the respective float links 72, 73 are disposed to be registerable with similar alignable apertures in the respective hitch arms when the float links are in their lowered or depressed position relative to the hitch arms, and when thus arranged may receive removable pins such as 108a, 109a for locking said float links in position and thereby restricting the rotative movement thereof relative to the respective hitch arms. When so disposed the float links serve as relatively rigid extensions of the respective hitch arms and are movable therewith.

From the foregoing, it should be apparent that a novel implement-attaching hitch mechanism has been shown and described, and it is to be understood that changes may be made in the construction without departing from the spirit of the invention or the scope thereof as defined in the appended claims.

What is claimed is:

1. In a hitch mechanism for supportably and detachably fastening an earthworking implement to a tractor, the combination, comprising: a pair of generally fore-and-aft extending laterally spaced-apart draft links mounted at the forward ends thereof on the tractor for lateral and vertical swinging; means extending between the rearward ends of said draft links and selectively connectible therebetween for permitting limited lateral swinging of said draft links or for restraining the lateral swinging thereof; a rigid upper link member pivotally mounted at a forward end thereof on the tractor for lateral and vertical swinging; a pair of intermediate links connected one each to a respective rearward end portion of said draft links and extending rearwardly therefrom; said intermediate links being pivotally connected to the respective draft links on a laterally extending horizontal axis and being rotatable in vertical planes relative to the respective draft links; each intermediate link being fashioned with a projection extending outwardly from one side thereof and toward one another, and having a downwardly facing bumper thereon; each said downwardly facing bumper having first and second surface portions in the same vertical planes as the respective draft links with the first portion being angularly disposed relative to the second portion; said first and second surface portions, upon rotation of said intermediate links in vertical planes relative to said draft links, being cooperatively engageable with the respective draft links for limiting said rotative movement of said intermediate links; and means including a yoke member interconnecting the rearward ends of said intermediate links and said upper link for effecting a coordinated movement of the rearward ends of said upper link and said intermediate links.

2. In a hitch mechanism for supportably and detachably fastening an earthworking implement to a tractor, the combination, comprising: a pair of generally fore-and-aft extending laterally spaced-apart draft links mounted at the forward ends thereof on the tractor for lateral and vertical swinging; means extending between the rearward ends of said draft links and selectively connectible therebetween for permitting limited lateral swinging of said draft links or for restraining the lateral swinging thereof; a rigid upper link member pivotally mounted at a forward end thereof on the tractor for lateral and vertical swinging; a pair of intermediate links connected one each to a respective rearward end portion of said draft links and extending rearwardly therefrom; said intermediate links being pivotally connected to the respective draft links on a laterally extending horizontal axis and being rotatable in vertical planes relative to the respective draft links; each intermediate link being fashioned with a projection extending outwardly from one side thereof and toward one another, and having a downwardly facing bumper thereon; each said downwardly facing bumper having first and second surface portions in the same vertical planes as the respective draft links with the first portion being angularly disposed relative to the second portion; said surface portions, upon rotation of said intermediate links in vertical planes relative to said draft links, being cooperatively engageable in abutting relationship selectively with said draft links so that upon rotation of said intermediate links in one direction said first surface portions engage the respective draft links to restrict further rotation in said one direction and upon rotation in another direction said second surface portions engage the respective draft links to restrict further rotation in said another direction; separate interlocking means cooperative between said intermediate links and the respective draft links to fixedly position said intermediate links against rotation in either direction when said first surface portions are in abutting engagement with said draft links; and means including a yoke member interconnecting the rearward ends of said intermediate links and said upper link for effecting a coordinated movement of the rearward ends of said upper link and said intermediate links.

3. The structure described in claim 2 and further characterized in that the said separate interlocking means comprises manually removable pins insertable in aligned apertures provided in the intermediate links and the respective draft links for restricting relative rotative movement between said intermediate and draft links.

4. In a hitch mechanism for supportably and detachably fastening an earthworking implement to a tractor, the combination, comprising: a pair of generally fore-and-aft extending laterally spaced-apart draft links having upwardly facing longitudinally extending surfaces and being mounted at the forward ends thereof on the tractor for lateral and vertical swinging; connecting means extending between the rearward ends of said draft links selectively connectible therebetween for permitting limited swinging of said draft links or for restraining the lateral swinging thereof; a rigid upper link member pivotally mounted at a forward end thereof on the tractor for lateral and vertical swinging; a pair of intermediate links pivotally connected one each to a rearward end portion of a respective draft link and being rotatable in vertical planes relative to said draft links and extending rearwardly therefrom; each intermediate link being fashioned with a projection extending outwardly therefrom and with said projection having a downwardly facing abutment surface thereon; each said latter surface having first and second portions angularly disposed relative to one another; said portions being disposed so that upon rotation of said intermediate links in one direction relative to said draft links said first portions abuttingly engage the upwardly facing surfaces on the respective draft links to limit the amount of rotation thereof, and upon rotation in the opposite direction said second portions abuttingly engage the upwardly facing surfaces on the respective draft links to limit the amount of rotation in said opposite direction; separate interlocking pin means cooperatively positionable between said intermediate links and the respective draft links when said first portions are in abutting engagement with the respective draft links to restrict said intermediate links against rotation in either of said directions; and means including a yoke member interconnecting the rearward ends of said intermediate links and said upper link for effecting a coordinated movement of the rearward ends of said upper and intermediate links.

5. In a hitch mechanism for supportably and detachably fastening an earthworking implement to a tractor, the combination, comprising: a pair of generally fore-and-aft extending laterally spaced-apart draft links mounted at the forward ends thereof on the tractor for lateral and vertical swinging; means extending between the rearward ends of said draft links and selectively connectible therebetween for permitting limited lateral swinging of said drift links or for restraining the lateral swinging thereof; an upper link member pivotally mounted at a forward end thereof on the tractor for lateral and vertical swinging; transport swing limiting means including a pair of laterally spaced roller elements mounted on the tractor and camming surfaces carried on each of said draft links and disposed for cooperative interengagement for restricting lateral swinging of said draft links when said draft links are eleavted to a transport position thereof; a pair of extension links pivotally connected one each at a forward end thereof to a rearward end portion of a respective draft link and being rotatable in a vertical plane relative to the respective draft link and extending rearwardly therefrom; abutment means including a separate projection extending one from each of said extension links and disposed upon rotation of said extension links relative to said draft links for cooperative abutting engagement with a respective draft link to limit relative rotative movement therebetween; and means including a yoke member interconnecting the rearward ends of said extension links and said upper link for effecting a coordinated movement of the rearward ends of said upper link and said extension links.

References Cited in the file of this patent
UNITED STATES PATENTS

| | | |
|---|---|---|
| 2,692,148 | Bywater | Oct. 19, 1954 |
| 2,734,438 | Todd | Feb. 14, 1956 |
| 2,935,147 | Edman | May 3, 1960 |